US009462566B1

(12) United States Patent
Koller et al.

(10) Patent No.: US 9,462,566 B1
(45) Date of Patent: Oct. 4, 2016

(54) SYSTEM AND METHOD FOR PROVIDING LIMITED COMMUNICATION SERVICES TO UNPROVISIONED MOBILE COMMUNICATION DEVICES

(71) Applicant: Sprint Communications Company L.P., Overland Park, KS (US)

(72) Inventors: Gary D. Koller, Overland Park, KS (US); Mark D. Peden, Olathe, KS (US); Raymond E. Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 75 days.

(21) Appl. No.: 14/275,164

(22) Filed: May 12, 2014

(51) Int. Cl.
*H04W 60/04* (2009.01)
*H04W 4/00* (2009.01)

(52) U.S. Cl.
CPC .................... *H04W 60/04* (2013.01)

(58) Field of Classification Search
CPC ..... H04L 12/14; H04M 15/00; H04M 15/46; H04M 15/80; H04W 4/001; H04W 4/003; H04W 4/24; H04W 4/26; H04W 8/18
USPC ....................... 455/435.1, 410, 411
See application file for complete search history.

(56) References Cited

U.S. PATENT DOCUMENTS

| | | | | |
|---|---|---|---|---|
| 5,893,031 A * | 4/1999 | Hoogerwerf | ............ | H04L 63/08 455/410 |
| 8,583,112 B2 * | 11/2013 | Booth | ............ | H04M 3/00 455/417 |
| 2002/0026341 A1 * | 2/2002 | Marsh | ............ | G06Q 10/06 455/406 |
| 2006/0293050 A1 * | 12/2006 | Chambers | ............ | G06Q 20/3821 455/433 |
| 2008/0086371 A1 * | 4/2008 | Daymond | ............ | G06Q 30/0255 705/14.53 |
| 2013/0132854 A1 * | 5/2013 | Raleigh | ............ | G06F 3/0482 715/738 |
| 2014/0198687 A1 * | 7/2014 | Raleigh | ............ | H04L 67/306 370/259 |
| 2015/0181503 A1 * | 6/2015 | Nasir | ............ | H04W 48/02 455/411 |

* cited by examiner

*Primary Examiner* — Nathan Taylor (57) ABSTRACT

A method of managing a pre-configuration mode for a mobile communication device supporting services. The method comprises responsive to the mobile communication device is not being provisioned for wireless communications service, not being assigned to any user account, and not being flagged as in a pre-configuration mode, assigning a temporary identifier corresponding to a service profile to the mobile communication device selected from a plurality of temporary identifiers, wherein a limited set of services is assigned to the service profile, wherein each service profile from a plurality of service profiles defines a specific limited set of services from a plurality of sets of limited services, wherein limited services are less services than services to fully provisioned mobile communication devices. The method further comprises monitoring time elapsed from the assignment of the temporary identifier, and transmitting an advertisement to the mobile communication device in response to the device invoking a service.

20 Claims, 7 Drawing Sheets

SYSTEM AND METHOD FOR PROVIDING LIMITED COMMUNICATION SERVICES TO UNPROVISIONED MOBILE COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telephones are electronic devices that are used for mobile voice and/or data communications based on wireless network connectivity, which can be provided by base stations known as cell towers or sites. Such electronic devices may be associated with an electronic serial number (ESN), a stock keeping unit (SKU) number, and other identifying information. Mobile telephones and similar electronic/communications devices may be packaged with operating manuals, warning documents, charging devices, and other accessories in a point-of-sale package suitable for distributing to end users. A plurality of point-of-sale packages, each containing an electronic device, may be shipped together to a retail store or business location. Electronic devices may be configured prior to shipping with unique packaging, hardware and software branding, features and functionality.

SUMMARY

In an embodiment, a method of managing a pre-configuration mode for a mobile communication device supporting services is disclosed. The method comprises comparing signal characteristics of a mobile communication device received during registration of the mobile communication device with a base transceiver station with records of signal characteristics in a data store. The method further comprises responsive to the mobile communication device not being provisioned for wireless communications service, not being assigned to any user account, and not being flagged as in a pre-configuration mode, assigning a temporary identifier corresponding to a service profile to the mobile communication device selected from a plurality of temporary identifiers, wherein a limited set of services is assigned to the service profile, wherein each service profile from a plurality of service profiles defines a specific limited set of services from a plurality of sets of limited services, wherein limited services are less services than services to fully provisioned mobile communication devices. The method further comprises monitoring time elapse from the assignment of the temporary identifier, and transmitting an advertisement to the mobile communication device in response to the device invoking a service. The method further comprises, responsive to a predefined period of time elapsing since the assignment of the temporary identifier and responsive to the mobile communication device not being provisioned, terminating limited services defined in the service profile.

In an embodiment, a method of managing a pre-configuration mode for a mobile communication device supporting services is disclosed. The method comprises comparing a radio signal fingerprint received from a mobile communication device during registration of the mobile communication device with a base transceiver station with records of radio signal fingerprints in a data store, wherein a radio signal fingerprint is unique radio transmission characteristics of a radio transmitter of a mobile communication device. The method further comprises responsive to the mobile communication device not being associated with a specific user account, not being provisioned for wireless communications service, and not being in a pre-configuration mode, assigning a temporary identifier corresponding to a service profile to the mobile communication device selected from a plurality of temporary identifiers, wherein a limited set of services is assigned to the service profile, wherein each service profile from a plurality of service profiles defines a specific limited set of services from a plurality of sets of limited services, wherein limited services are less services than services to fully provisioned mobile communication devices. The method further comprises monitoring time elapse from the assignment of the temporary identifier, and when a predefined period of time elapses since the assignment of the temporary identifier and responsive to the mobile communication device not being provisioned for wireless communications service, reducing one service from the services defined in the service profile at a time. The method further comprises responsive to the mobile communication device meeting predefined criteria, provisioning the mobile communication device for wireless communications service, and responsive to the mobile communication device not being provisioned for wireless communications service and a predefined period of total time elapses, terminating the services defined in the service profile.

In an embodiment, a method of managing a pre-configuration mode for an unprovisioned mobile communication device supporting services is disclosed. The method comprises examining signal characteristics from a mobile communication device during registration of the mobile communication device with a base transceiver station against records of signal characteristics in a data store. The method further comprises responsive to the mobile communication device not being provisioned for wireless communications service, assigning a service profile to the mobile communication device selected from a plurality of service profiles, wherein a limited set of services is assigned to the service profile, wherein each service profile from a plurality of service profiles defines a specific limited set of services from a plurality of sets of limited services, wherein limited services are less services than services to fully provisioned mobile communication devices. The method further comprises monitoring time elapse from the assignment of the service profile, and presenting an advertisement to the mobile communication device in response to the device invoking a service. The method further comprises when a predefined period of time elapses since the assignment of the service profile and responsive to the mobile communication device not being assigned to a user account and not provisioned for wireless communications service, terminating services defined in the service profile.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Some current mobile communication devices are made and shipped to customers before an operating system or other software is fully developed for the mobile communication devices. When the customer turns on the mobile communication device for the first time, an upgrade to the most current version of the operating system or the most current version of other software may be installed before the mobile communication device is provisioned. Provisioning may comprise wireless communications service provisioning, device provisioning, or other provisioning. Without wireless communications service provisioning, the wireless communication may not permit the mobile communication device to make voice calls or data calls, with the exception of calls to emergency services. During the process of upgrading the operating system or the software, the mobile communication device may not be used to perform functionality except emergency calls.

More functionality may be desirable before the mobile communication device is fully provisioned. A wireless communications service provider may benefit from providing a limited set of communication services to unprovisioned or incompletely provisioned mobile communication devices. For example, the customer experience may be improved when customers are able to use unprovisioned mobile communication devices to access the limited set of communication services. The wireless communications service provider may present advertisements to unprovisioned mobile communication devices and make revenue while providing the limited set of communication services to the mobile communication devices. Additionally, mobile communication devices, unprovisioned for wireless communications service with a mobile communication network of the wireless communications service provider, that were once supported by the wireless communications service provider and/or are currently supported by another wireless communications service provider may start wireless communications service with the wireless communications service provider after using the limited set of communication service provided by the wireless communications service. The present disclosure teaches a system and method of managing a pre-configuration mode on unprovisioned and/or incompletely provisioned mobile communication devices supporting services.

For example, when a mobile communication device registers with a base transceiver station (BTS), the BTS may communicate with a mobile switching center (MSC) to validate the mobile communication device and/or a subscriber account of the mobile communication device. When the mobile communication device is unprovisioned or not provisioned, the mobile communication device may know an equipment identifier but not anything else about its identity or the subscriber account. The MSC may examine equipment records in a data store to compare the equipment identifier with equipment identifiers stored in the data store. An equipment record may comprise radio signal characteristics, a pre-configuration status indicator, an equipment identifier, a subscriber account identifier, or another type of equipment record. Characteristics of a radio signal received from the mobile communication device may be captured, analyzed, characterized, and then transmitted from the BTS to an application on a server or the MSC for authentication of the mobile communication device, for example for the MSC to compare with radio signal characteristic records in the data store. The application may be implemented on the MSC or on a separate physical computer server other than the MSC. The application and the MSC may communicate with each other for mobile communication device identity and subscriber account identity verification purposes.

A radio signal fingerprint may be used by the application as unique radio signal characteristics of a radio transmitter of a mobile communication device to identify the mobile communication device. Different mobile communication devices may have different radio signal characteristics that may be isolated, captured, and used to identify a particular mobile communication device. As an analogy with common experience, when people speak we may use the characteristics of a known voice to recognize a particular person without or before seeing them. Similarly, radio signal characteristics, for example a radio signal fingerprint, may be used to identify a particular mobile communication device even though mobile communication devices may communicate with a BTS using the same wireless communication protocol. The radio signal characteristics may be used with the equipment identifier to identify the mobile communication device, for example before a network identifier and/or access credentials are assigned to the mobile communication device during a configuration or provisioning process. When the radio signal characteristics and the equipment identifier do not correspond to a same identity, the identity that corresponds to the radio signal characteristics may be used as the real identity. If no record of radio signal characteristic record is found to match the radio signal characteristic of the mobile communication device, the radio signal characteristics of the mobile communication device may be recorded in the data store.

When an equipment record is found for the mobile communication device, it may be examined whether or not the mobile communication device is flagged as in a pre-configuration mode. A pre-configuration mode taught by the present disclosure may enable an unprovisioned or incompletely provisioned mobile communication device to utilize a limited set of communication services or restricted communication services provided by a wireless communications network. The limited set of services may comprise fewer services than services to a fully provisioned mobile communication device. If the mobile communication device is flagged as in a pre-configuration mode, the mobile communication device is already in a pre-configuration mode and a policy enforcement function of the network may enforce a limited set of services assigned to the mobile communication device. When the mobile communication device is not flagged as in a pre-configuration mode, further action may be taken to identify the subscriber account for the mobile communication device. For example, the MSC may find a corresponding subscriber account, for example a subscriber identifier, in the data store to identify the subscriber account of the mobile communication device.

Under some circumstances, a mobile communication device may be determined to be unprovisioned for wireless communications service. For example, as discussed earlier, when the mobile communication device can only provide the BTS with its equipment identifier, the mobile communication device may be determined to be unprovisioned. When a mobile communications device can provide the BTS with an equipment identifier and an expired subscriber account that had been assigned by the wireless communications service provider, the mobile communication device may be determined to be unprovisioned. Additionally, when a mobile communication device can provide an equipment identifier and a subscriber account assigned by a home service provider other than the wireless communication service provider that maintains the BTS and MSC but is denied roaming with the wireless communications service provider by its own home service provider, the mobile communication device may be determined to be unprovisioned. A different level of risk may be associated with mobile communication devices of each of these cases.

The wireless communication service provider may be at different levels of risk when providing free services to different unprovisioned or incompletely provisioned mobile communication devices. For example, some users of the unprovisioned mobile communication devices may attempt to use the free services without ever provisioning the mobile communication devices. When the mobile communication devices are not provisioned with wireless communication services provided by the wireless communication service provider, the service provider may not be able to charge the user of the mobile device for services provided and may thus suffer financial loss. Additionally, unauthenticated mobile communication devices may be potential security attackers to the wireless communication network. Based on different factors, the mobile communication device may be determined to be of a different risk level.

When a mobile communication device is determined to be unprovisioned and not in a pre-configuration mode, the server may assign a temporary identifier to the mobile communication device selected from a plurality of temporary identifiers. A plurality of temporary identifiers may correspond to a plurality of service profiles. The temporary identifier may correspond to a service profile. A range of temporary identifiers may correspond to a specific service profile. For example, temporary identifiers 0 to 9999 may correspond to service profile 1. Temporary identifiers 10000 to 19999 may correspond to service profile 2. Temporary identifiers 90000 to 99999 may correspond to service profile 10. A plurality of service profiles may define a plurality of limited sets of services. Each service profile may correspond to a specific limited set of services. The limited set of services may comprise fewer services than services to a fully provisioned mobile communication device. For example, the limited services may comprise data and voice calls to a limited set of addresses, for example voice calls to local addresses and/or through BTSs maintained by the wireless communications service provider, data calls to a limited set of websites, or another type of limited services. The limited services may support unlimited emergency services, for example 911 calls, since emergency services may be provided to mobile communication services under all circumstances. The limited services may comprise the same set of services provided to a provisioned device but may impose further restrictions on the use of those services, for example restricting voice calls to local calls and/or restricting data connections to a white list of allowed domain names or internet protocol addresses.

An unprovisioned mobile communication device may be assigned with a service profile based on the risk level of the mobile communication device and/or the user account. Risk levels may be scored on a scale of 0 to 2, where 0 denotes the lowest risk level and 2 denotes the highest risk level regarding unprovisioned mobile communication devices. A service profile with a lower risk level may define a fuller set of services or less restricted services (though still limited services with reference to a fully provisioned device) than a service profile with a higher risk level. For example, a mobile communication device with a valid subscriber account with the wireless communications service provider may be considered to have the lowest risk level and may be assigned with a service profile with a risk level of 0. A mobile communication device with an invalid subscriber account with the wireless communications service provider, for example an expired subscriber account, may be considered to have a medium risk level and may be assigned with a service profile with a risk level of 1. A mobile communication device with a home service provider different from the wireless communications service provider whose roaming service request with the wireless communications service provider is denied by its home service provider may be considered to have the highest risk level and may be assigned with a service profile with a risk level of 2.

An application on the server may monitor elapsed time since the assignment of the temporary identifier to the mobile communication device. The mobile communication device may be flagged as in a pre-configuration mode in a data store maintained by the wireless communications service provider. An advertisement may be transmitted to present on the mobile communication device in response to the mobile communication device invoking a service. A reminder to the user and/or subscriber of upgrading the operating system and provisioning the mobile communication device may also be presented to the mobile communication device. After a predefined time period since the assignment of the temporary identifier, the application may terminate the limited services that are defined by the service profile. Alternatively, the application may begin shrinking the limited services, for example removing one service at an interval of every predefined period of time elapse since the assignment of the temporary identifier. On the other hand, when the operating system and/or relevant software of the mobile communication device is upgraded, the mobile communication device may be fully provisioned and may use full services of the wireless communications network.

By setting a pre-configuration mode and providing a limited set of communication services and/or a set of restricted communication to unprovisioned or incompletely provisioned mobile communication devices while limiting resource cost for these limited services, the wireless communication service provider may benefit from a variety of aspects. For example, the wireless communication service provider may make revenue by presenting advertisements on the mobile communication devices in the pre-configuration mode. Complaints from subscribers of the wireless communication service provider on no service before provisioning mobile communication devices may be reduced. Mobile communication devices that were previously provisioned for wireless communications service with the network of the wireless communication service provider may again start services with the wireless communication service provider. Additionally, mobile communication devices from another wireless communication service provider may switch service to the wireless communication service provider after using the limited services from the wireless communication service provider in a pre-configuration mode.

Figure 1:
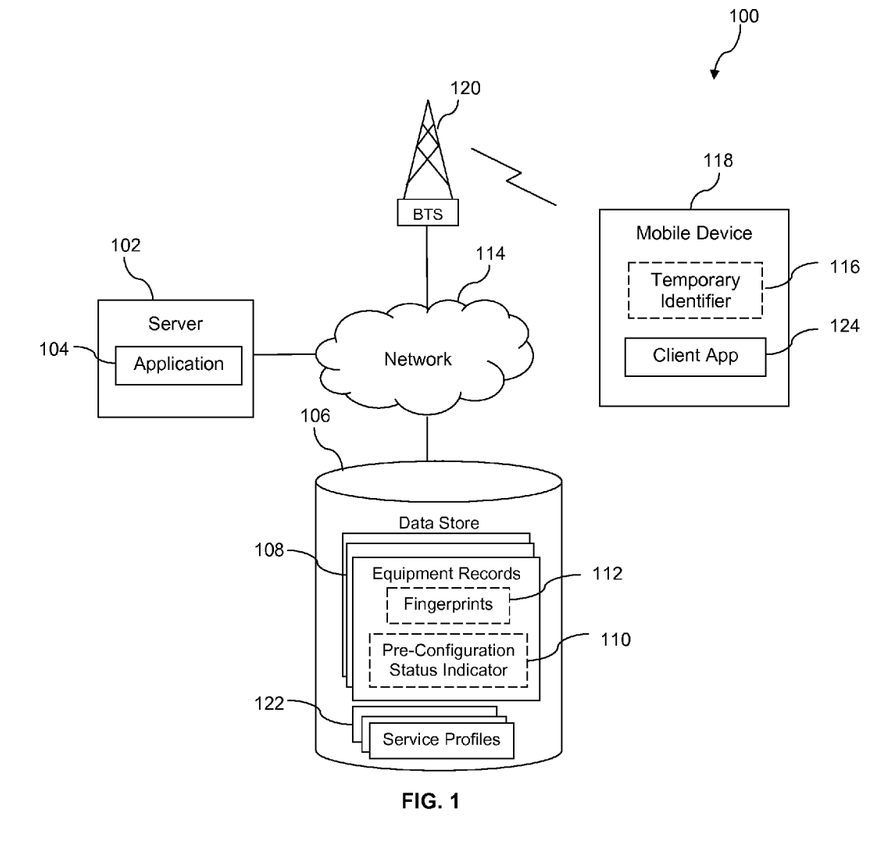
FIG. 1 is an illustration of a communication system according to an embodiment of the disclosure.

Turning now to FIG. 1, a communication system 100 is described. In an embodiment, the communication system 100 comprises a plurality of mobile communication devices 118, a data store 106, and a server 102. The mobile communication device 118 may comprise a temporary identifier 116 and a client application 124. The server 102 may comprise an application 104. The data store 106 may comprise a plurality of equipment records 108 and a plurality of service profiles 122. The data store 106 may be a home location register (HLR), a visitor location register (VLR), or another type of data store. Each equipment record 108 may comprise a fingerprint 112 and a pre-configuration status indicator 110. The mobile communication device 118 may be configured to use a radio transceiver to establish a wireless communication link with a base transceiver station (BTS) 120, and the BTS 120 may provide communications connectivity of the mobile communication device 118 to a network 114. The server 102 may be a server maintained by a wireless communications service provider. A wireless communications service provider may also be referred to as a network carrier herein. The server 102 and the data store 106 may also have access to the network 114. The network 114 may comprise any combination of private and public networks.

It is understood that the communication system 100 may comprise any number of mobile devices 118, any number of base transceiver stations 120, and any number of servers 102. The collectivity of base transceiver stations 120 may be said to comprise a radio access network, in that these base transceiver stations 120 may provide a radio communication link to the mobile devices 118 to provide access to the network 114.

The radio transceiver of the mobile communication device 118 may communicate with the BTS 120 using any of a variety of wireless communication protocols including a code division multiple access (CDMA) wireless communication protocol, a global system for mobile communication (GSM) wireless communication protocol, a long-term evolution (LTE) wireless communication protocol, a worldwide interoperability for microwave access (WiMAX) wireless communication protocol, or another wireless communication protocol. The mobile communication device 118 may be any of a mobile phone, a personal digital assistant (PDA), a wireless enabled computer, a media player, a laptop computer, a notebook computer, a tablet computer, a wearable computer, a headset computer, or another network/communications capable device. In an embodiment, the mobile communication device 118 may have other components (not shown) such as a near field communication (NFC) radio transceiver, a short range radio transceiver such as a wireless local area network (WLAN) radio transceiver, or other components.

In an embodiment, a temporary identifier 116 may be assigned to a mobile communication device 118 that is not yet provisioned. The assignment of the temporary identifier 116 may promote the mobile communication device 118 receiving limited services from a wireless communications service provider. The temporary identifier 116 may be selected from a plurality of temporary identifiers 116. The temporary identifier 116 may correspond to a service profile 122. A range of temporary identifiers 116 may correspond to a specific service profile 122. For example, temporary identifiers 0 to 9999 may correspond to service profile 1. Temporary identifiers 10000 to 19999 may correspond to service profile 2. Temporary identifiers 90000 to 99999 may correspond to service profile 10.

The service profile 122 may associate to and/or define a limited set of communication services and/or restricted communication services. For example, a table may be maintained in the data store 106 defining service profiles and corresponding sets of limited services. Alternatively, a plurality of service profiles 122 may define a plurality of distinct sets of limited services. Each service profile 122 may define a specific limited set of services. The limited services may comprise fewer services than services to a fully provisioned mobile communication device 118. For example, the limited services may comprise data and voice calls to a limited set of addresses, for example voice calls to local addresses and/or through BTSs 120 maintained by the wireless communications service provider, data calls to a limited of websites, or another type of limited services. The limited services may support unlimited emergency services, for example 911 calls, since emergency services may be provided to mobile communication services under all circumstances.

Generally, wireless communication service providers may avoid providing service to unprovisioned mobile communication devices 118 because the service providers may want to avoid providing service for free. Providing a network to support ubiquitous mobile calling may be costly. A wireless communication service provider may not be able to survive in business by providing its network to support ubiquitous mobile calling to mobile communication devices that are not provisioned and hence may not be paying for their services. Wireless communication service is a competitive business. Carrying 5% of users who do not pay for communication service may lead to about a 5% overbuilt (relative to the paying subscriber base) network and hence a significant inefficiency. However, the service provider may afford it if only few network assets are involved when providing limited communication services and/or restricted communication services to unprovisioned mobile communication devices 118. Thus, limited services may be provided to unprovisioned mobile communication devices 118 with less burden on the network, fewer network assets engaged, and less cost to the service provider. In general, voice or data call attempts from a provisioned mobile communication device 118 are allowed to any well-formed and/or valid address. In an embodiment, communication service for unprovisioned or not fully provisioned devices may be restricted to addresses defined on a white list of addresses (voice calls) or to restricted domains (data calls) defined on a white list of domains.

In an embodiment, the limited communication services may comprise data and/or voice calls to a limited set of addresses. Voice calls defined in the limited services may be voice calls to local telephone numbers. The limited services may comprise voice calls through base transceiver stations 120 maintained by the wireless communications service provider, but may not comprise voice calls through roaming. The limited services may comprise data calls to a limited number of websites. Additionally, the limited services may comprise customer care data traffic, payment data traffic, or another type of data traffic. In some contexts, these may be referred to as restricted communication services.

The pre-configuration status indicator 110 may be flagged for mobile communication devices 118 that are in pre-configuration modes. When a mobile communication device 118 registers with a BTS 120, the BTS 120 may communicate with a corresponding mobile switching center (MSC), and the MSC may search the data store 106 for an equipment record 108 for the mobile communication device 118. An equipment record 108 may comprise a fingerprint record 112, a pre-configuration status indicator 110, an equipment identifier, and/or a subscriber account identifier. The equipment identifier may be a mobile equipment identifier (MEID), an electronic serial number (ESN), or another type of equipment identifier. When a mobile communication device 118 is unprovisioned, the mobile communication device 118 may only know its equipment identifier. The mobile communication device 118 may not know a network identifier. The mobile communication device 118 may not know access credentials.

The mobile communication device 118 may transmit the equipment identifier to the BTS 120. When a mobile communication device 118 was previously provisioned for wireless communications service with a network of a wireless communications service provider that maintains the BTS 120 and the MSC, the mobile communication device 118 may also transmit a subscriber account identity to the BTS 120. When a mobile communication device 118 is provisioned for wireless communications service with a home service provider network other than the wireless communications service provider that maintains the BTS 120 and the MSC, the mobile device 118 may transmit to the BTS 120 its equipment identifier and/or a subscriber account identity with its home service provider. The BTS 120 may also collect radio signal characteristics from the mobile device 118, for example a radio signal fingerprint.

A radio signal fingerprint may be unique radio transmission characteristics of a radio transmitter of a mobile communication device 118. Different mobile communication devices 118 may have different radio signal characteristics that may be isolated, captured, and used to identify a particular mobile communication device 118. When different people speak, characteristics of voices may be used to recognize a particular person. Similarly, radio signal characteristics, for example a radio signal fingerprint, may be used to identify a particular mobile communication device 118 even though mobile communication devices 118 may communicate with the BTS 120 using the same wireless communication protocol. The equipment identifier and/or the radio signal fingerprint may be forwarded to an application 104 on a server 102 or the MSC for authentication of the mobile communication device 118, for example for the MSC to compare with radio signal characteristic records in the data store 106. The application 104 may be implemented on the MSC or on a separate physical computer server, for example the server 102, other than the MSC. The application 104 and the MSC may collaborate to identify the mobile communication device and/or the subscriber account.

An equipment record 108 corresponding to the radio signal fingerprint may be located in the data store 106 based on the equipment identifier. If the equipment record 108 already comprises a fingerprint 112 record, the fingerprint collected from the mobile device 118 may be compared with the fingerprint 112 record. If the two fingerprints match, the mobile device 118 may be determined to correspond to the found equipment record 108. If the two fingerprints do not match, an equipment record 108 may be searched for by matching the fingerprint collected from the mobile device 118 to one of the fingerprint records 112 in the data store 106. When an equipment record 108 is found based on the equipment identifier received from the mobile device 118 without a fingerprint record 112, the fingerprint collected from the mobile device 118 may be added to the equipment record 108.

When no equipment record 108 can be found in the data store 106 by comparing the equipment identifier received from the mobile device 118 to equipment identifiers stored in the data store 106, an equipment record 108 may be searched for by matching the fingerprint collected from the mobile device 118 to one of the fingerprint records 112 in the data store 106. If no equipment record 108 is found by matching fingerprints, the application 104 may create an equipment record 108 with the equipment identifier and/or the fingerprint received from the mobile device 118.

Under some circumstances, a mobile communication device 118 may be determined to be unprovisioned for wireless communications service, for example by the application 104. For example, when a mobile communication device 118 attempting to originate a call can only provide the BTS 120 with its equipment identifier, the mobile communication device 118 may be determined to be unprovisioned by the application 104. When a mobile communications device 118 can provide the BTS 120 with an equipment identifier and an expired subscriber account that had been assigned by the wireless communications service provider, the mobile communication device 118 may be determined to be unprovisioned by the application 104. Additionally, when a mobile communication device 118 can provide an equipment identifier and a subscriber account assigned by a home service provider other than the wireless communication service provider that maintains the BTS 120 and the MSC but is denied roaming with the wireless communications service provider by its own home service provider, the mobile communication device 118 may be determined to be unprovisioned by the application 104. The mobile device 118 may be determined to be provisioned or not with wireless communications service by the application 104. A different level of risk may be associated with mobile communication devices of each of these cases.

When the mobile device 118 is determined to be unprovisioned by the application 104, the application 104 may examine the pre-configuration status indicator 110 of the equipment record 108 to determine the pre-configuration status of the mobile device 118. If the pre-configuration status indicator 110 is flagged as in a pre-configuration mode, the application 104 may notify the BST 120 of the pre-configuration status of the mobile device 118. The BTS 120 may request the mobile device 118 for a temporary identifier 116 that was assigned to the mobile device 118 when it was set to the pre-configuration status. On the other hand, when the pre-configuration status indicator 110 is not flagged as in a pre-configuration mode, the application 104 may flag the corresponding equipment record 108 as in a pre-configuration mode and notify the BTS 120 of the pre-configuration status of the mobile device 118. The application 104 may assign a temporary identifier 116 to the mobile communication device 118. A service profile 122 may correspond to the temporary identifier 116. The service profile 122 may be provided to service rendering platforms of the network, for example a service control point (SCP), a policy and charging rules function (PCRF), or another service rendering platform.

The application 104 may be stored in a memory of the server 102. When executed by a processor of the server 102, the application 104 may perform a variety of functionality. For example, the application 104 may assign a temporary identifier 116 that corresponds to a service profile 122 to an unprovisioned mobile communication device 118 at the time that the mobile communication device 118 attempts to register with a BTS 120. The application 104 may monitor time elapsed since assignment of the temporary identifier 116 to the mobile communication device 118. The application 104 may send a notification to the client application 124 on the mobile communication device 118 to present advertisements and/or reminders to the mobile communication device 118 before the mobile communication device 118 is provisioned. Additionally, the application 104 may terminate or further limit services provided to the mobile communication device 118 when time elapsed reaches a predefined amount.

In an embodiment, an unprovisioned mobile communication device 118 may be assigned with a service profile 122 by the application 104 based on the risk level of the mobile communication device 118 and/or the associated subscriber account. For example, risk levels may be scored on a scale of 0 to 2, where 0 denotes the lowest risk level and 2 denotes the highest risk level. It should be noted that other scales may be used with a greater number of risk levels or risk categories. A service profile 122 with a lower risk level may define a fuller limited set of communication services or a less restricted set of communication services than a service profile 122 with a higher risk level. For example, a mobile communication device 118 with a valid subscriber account with the wireless communications service provider may be considered to have a lowest risk level and may be assigned with a service profile 122 with a risk level of 0. A mobile communication device 118 with an invalid subscriber account with the wireless communications service provider, for example an expired subscriber account, may be considered to have a medium risk level and may be assigned with a service profile 122 with a risk level of 1. A mobile communication device 118 with a home service provider different from the wireless communications service provider whose roaming service request with the wireless communications service provider is denied by its home service provider may be considered to have a highest risk level and may be assigned with a service profile 122 with a risk level of 2.

For example, when a mobile communication device 118 with a valid subscriber account with the wireless communications service provider (risk level 0) originates a voice call to any local number (e.g. a local telephone number within an area code from a few local area codes) or a data call to few websites including a customer care website form the wireless communications provider, the voice call or the data call may be allowed. When a mobile communication device 118 with an invalid subscriber account with the wireless communications service provider (risk level 1) originates a voice call to an address that is few blocks down the street, for example within the same area code of the location where the mobile communication device 118 is physically located, the voice call may be allowed. Voice calls to addresses outside that specific area code may not be allowed. Data calls to a customer care website maintained by the wireless communication service provider may be allowed while data calls to any other domain may not be allowed. A mobile communication device 118 with a home service provider different from the wireless communications service provider (risk level 2) may be allowed with the same voice and data calls as the mobile communication devices with risk level 1. However, when a service attempt is made by the mobile communication device of risk level 2, an advertisement may be presented on the mobile communication device 118 to a user of the mobile communication device 118.

The application 104 may flag the mobile communication device 118 in the data store 106 as in a pre-configuration mode after the temporary identifier 116 is assigned to the mobile device 118. For example, the pre-configuration status indicator 110 of the equipment record 108 for the mobile communication device 118 may be flagged as in a pre-configuration mode. The application 104 may monitor time elapsed since assignment of the temporary identifier 116 to the mobile device 118.

An advertisement may be presented to the mobile communication device 118 in response to the device 118 invoking a service. For example, the application 104 may be notified by the BTS 120 when the mobile communication device 118 invokes a service. The application 104 may send a notification to the BTS 120 to transmit an advertisement to the mobile communication device 118. The client application 124 on the mobile communication device 118 may receive the advertisement and present the advertisement to the mobile communication device 118. A reminder may be presented to the mobile communication device 118 in a way similar to the advertisement. The reminder may remind a user of the mobile communication device 118 to upgrade the operating system and/or relevant software so that after the upgrading, the mobile communication device 118 may be provisioned. Before the operating system and/or the relevant software of the mobile communication device 118 is updated for the first time after first power-up of the mobile communication device 118, an advertisement and/or the reminder may be presented to the mobile communication device 118 in response to the device 118 invoking a service.

After a predefined period of time has elapsed since the assignment of the temporary identifier 116 to the mobile communication device 118, for example one week, two weeks, a month, or another period of time, the application 104 may terminate the limited services defined in the service profile 122 if the mobile device 118 is not fully provisioned. For example, the application 104 may transmit a notification to the client application 124 on the mobile communication device 118 to terminate the pre-configuration mode by terminating the limited services defined in the service profile 122. The client application 124 may configure the mobile communication device 118 to terminate the limited services. It is understood that emergency communication service may continue to be accessible to the mobile communication device 118.

Alternatively, the application 104 may remove one service at a time from the limited set of services every predefined period of time after the assignment of temporary identifier 116, for example every five days, every week, every two weeks, or at some other time interval if the mobile device 118 is not provisioned. The limited services may be terminated with different time intervals between two services terminated next to each other in time. For example, the time interval between the first terminated service and the second terminated service may be three weeks. The time interval between the second terminated service and the third terminated service may be two weeks. The time interval between the third terminated service and the fourth terminated service may be one week.

When the risk level of the mobile communication device 118 and/or the associated subscriber account is lower than a medium risk level, for example with a 0 risk level, the period of time after the assignment of the temporary identifier 116 and before the termination of the pre-configuration mode may be longer than a medium period of time after the assignment of the temporary identifier 116. When the risk level of the mobile communication device 118 and/or the associated subscriber account is higher than a medium risk level, for example with a 2 risk level, the period of time after the assignment of the temporary identifier 116 and before the termination of the pre-configuration mode may be shorter than a medium period of time after the assignment of the temporary identifier 116.

When the predefined period of time has elapsed and if the mobile communication device 118 meets predefined criteria, for example the mobile communication device 118 has been upgraded to the latest operating system for the first time after the first power-up, the mobile communication device 118 may be provisioned for wireless communications service.

Figure 2:
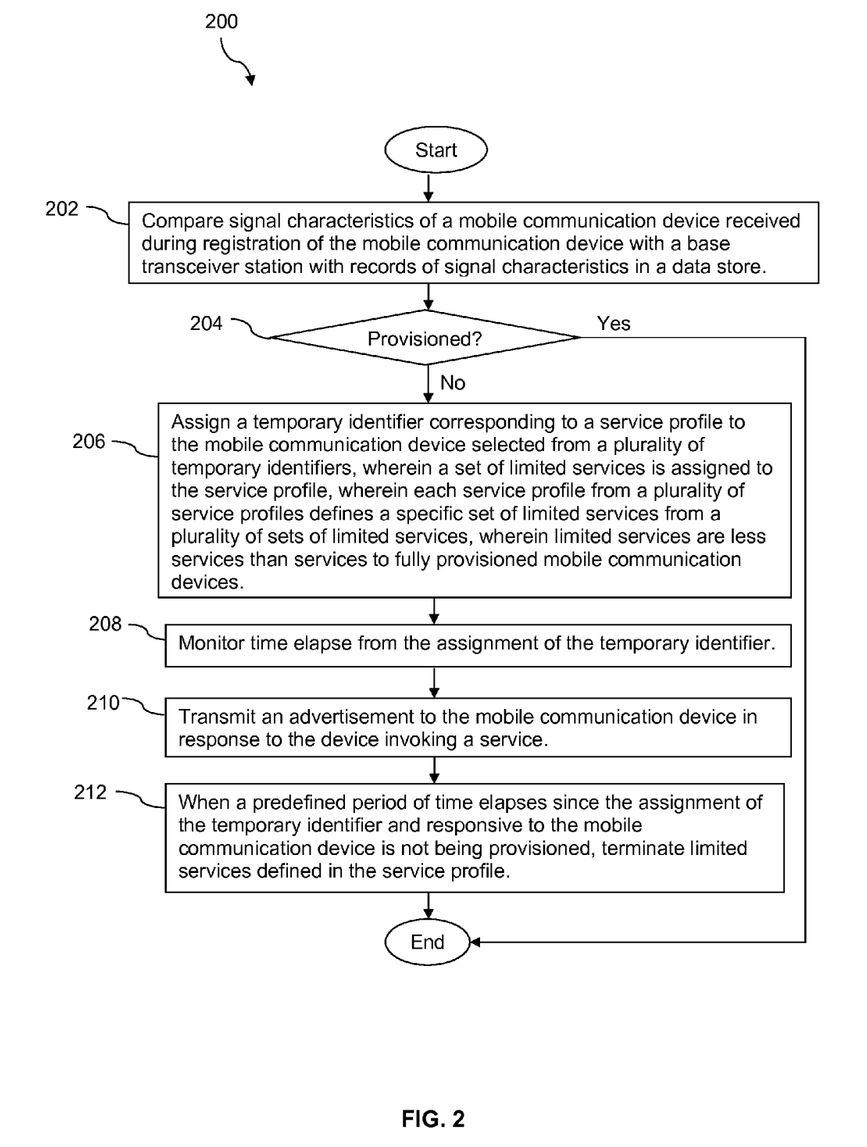
FIG. 2 is a flow chart illustrating a method according to an embodiment of the disclosure.

Turning now to FIG. 2, a method 200 is described. At block 202, signal characteristics of a mobile communication device received during registration of the mobile communication device with a base transceiver station is compared with records of signal characteristics in a data store. For example, signal characteristics of the mobile communication device 118 captured and/or received during registration of the mobile communication device 118 with a base transceiver station may be compared with records of signal characteristics in the data store 106.

At block 204, it is determined whether or not the mobile communication device is provisioned. For example, it may be determined whether or not the mobile device 118 is provisioned for wireless communications service, assigned to any user account, or flagged as in a pre-configuration mode. If the result of block 204 is false, which means the mobile device 118 is not provisioned, the process/method may proceed to block 206. For example, if the mobile device 118 is not provisioned for wireless communications service, not assigned to any user account, and not flagged as in a pre-configuration mode, the process may proceed to block 206. On the other hand, if the mobile communication device 118 is determined to be provisioned, for example provisioned for wireless communication service, the method may terminate. In this case, call processing may proceed according to a different method, for example according to standard call processing for fully provisioned devices.

At block 206, a temporary identifier 116 is assigned corresponding to a service profile 122 to the mobile communication device 118 selected from a plurality of temporary identifiers 116, wherein a limited set of services is assigned to the service profile 122, wherein each service profile 122 from a plurality of service profiles 122 defines a specific limited set of services from a plurality of sets of limited services, wherein limited services are less services than services to fully provisioned mobile communication devices.

At block 208, time elapse is monitored from the assignment of the temporary identifier 116. At block 210, an advertisement is transmitted to the mobile communication device 118 in response to the device invoking a service. At block 212, when a predefined period of time elapses since the assignment of the temporary identifier 116 and responsive to the mobile communication device 118 not being provisioned, limited services defined in the service profile 122 are terminated.

Figure 3:
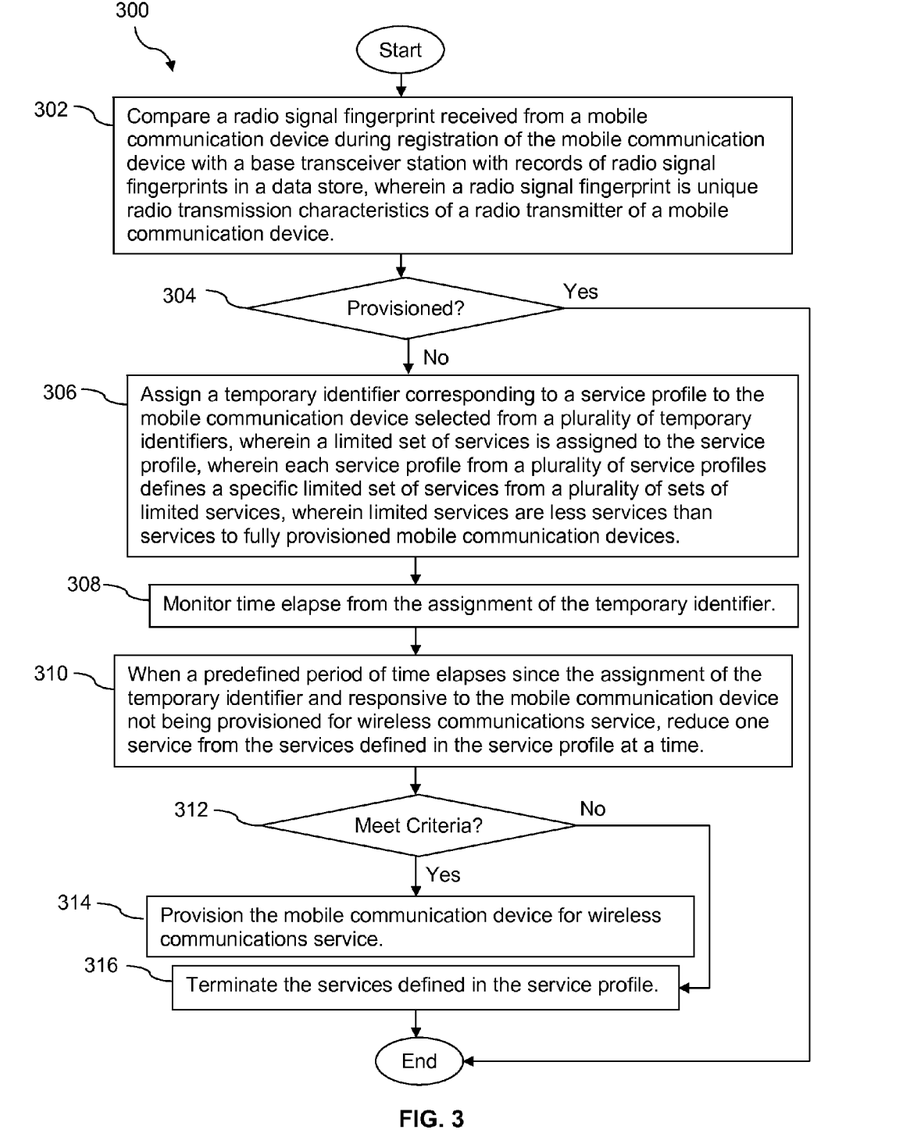
FIG. 3 is a flow chart illustrating another method according to an embodiment of the disclosure.

Turning now to FIG. 3, a method 300 is described. At block 302, a radio signal fingerprint received from a mobile communication device 118 during registration of the mobile communication device 118 with a base transceiver station is compared with records of radio signal fingerprints 112 in a data store 106, wherein a radio signal fingerprint comprises distinguishing radio transmission characteristics of a radio transmitter of a mobile communication device. At block 304, it is determined whether or not the mobile communication device 118 is provisioned. If the result of block 304 is false, which means the mobile communication device 118 is not provisioned, the method/process proceeds to block 306. For example, if the mobile device 118 is associated with a specific user account, not provisioned for wireless communications service, and not in a pre-configuration mode, the method may proceed to block 306. On the other hand, if the mobile communication device 118 is determined to be provisioned, for example provisioned for wireless communication service, the method may terminate. In this case, call processing may proceed according to a different method, for example according to standard call processing for fully provisioned devices.

At block 306, a temporary identifier 116 is assigned corresponding to a service profile 122 to the mobile communication device 118 selected from a plurality of temporary identifiers 116, wherein a limited set of services is assigned to the service profile 122, wherein each service profile 122 from a plurality of service profiles 122 defines a specific limited set of services from a plurality of sets of limited services, wherein limited services are less services than services to fully provisioned mobile communication devices.

At block 308, time elapse is monitored from the assignment of the temporary identifier 116. At block 310, when a predefined period of time elapses since the assignment of the temporary identifier 116 and responsive to the mobile communication device 118 not being provisioned for wireless communications service, one service is reduced from the services defined in the service profile 122 at a time.

At bock 312, it is determined whether or not the mobile communication device 118 meets predefined criteria. For example, it may be examined whether or not the mobile communication device 118 has upgraded its operating system to the latest version for the first time after the first power-up. If the result of block 312 is true, which means the mobile communication device 118 meets the predefined criteria, the method may proceed to block 314. On the other hand, if the result of block 312 is false, which means the mobile communication device 118 does not meet the predefined criteria, the method may proceed to block 316. At block 314, the mobile communication device 118 is provisioned for wireless communications service. At block 316, the services defined in the service profile 122 are terminated.

Figure 4:
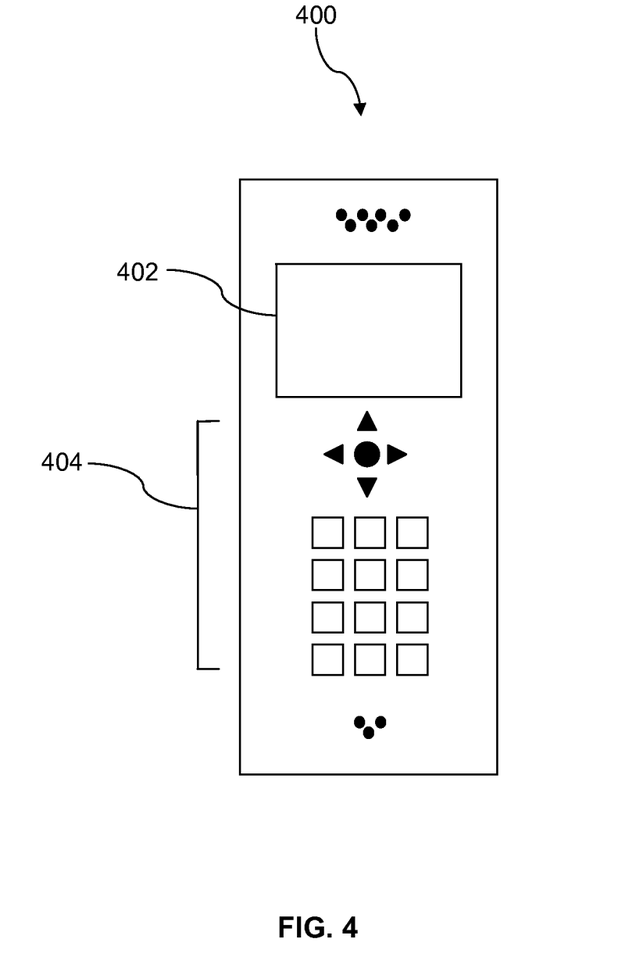
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
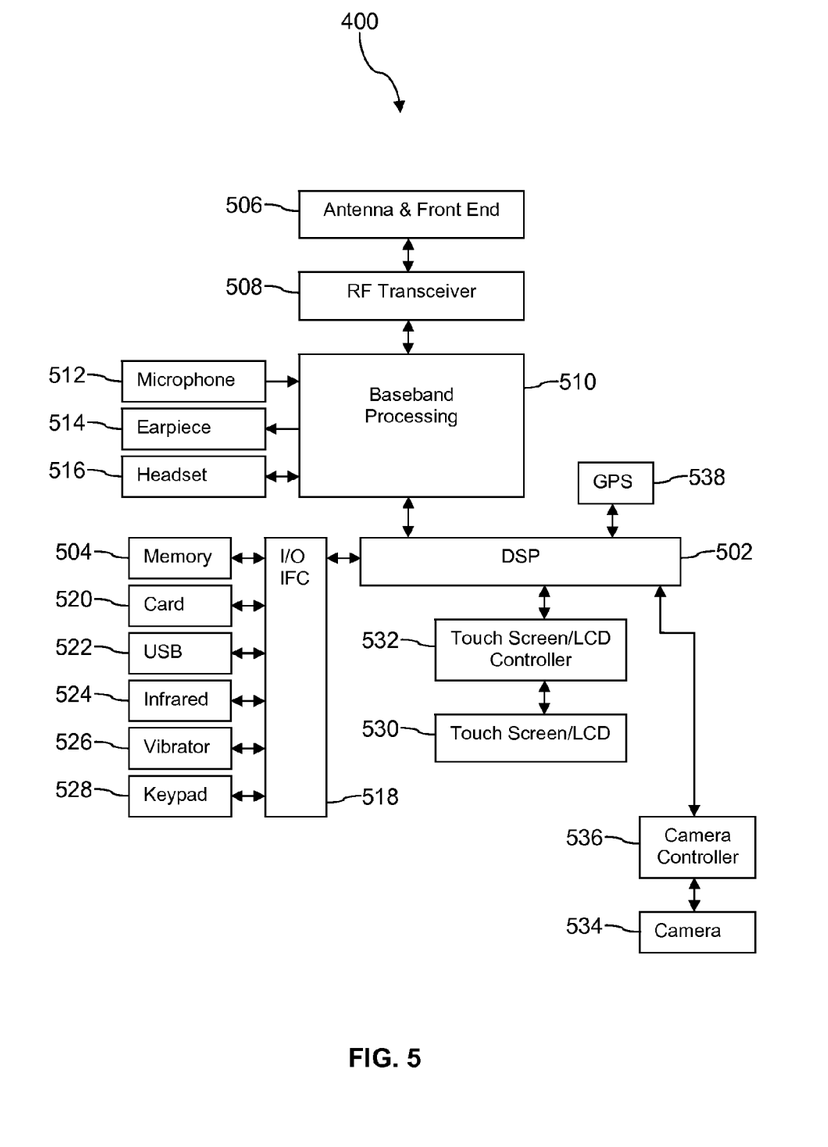
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
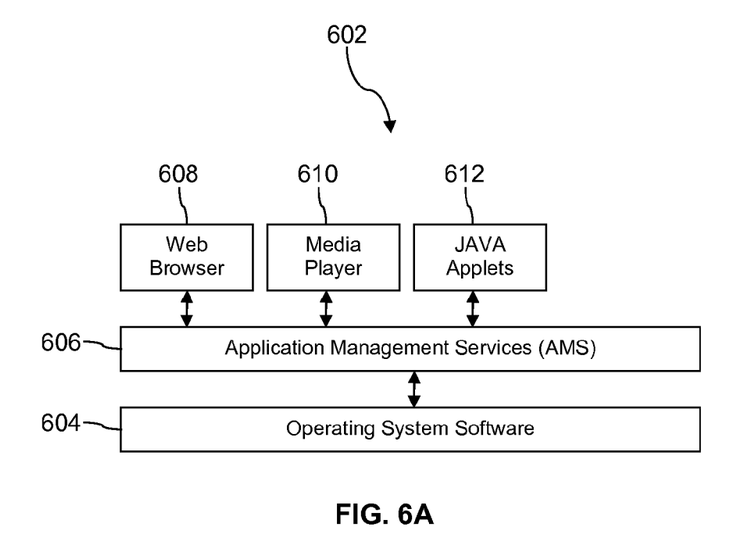
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
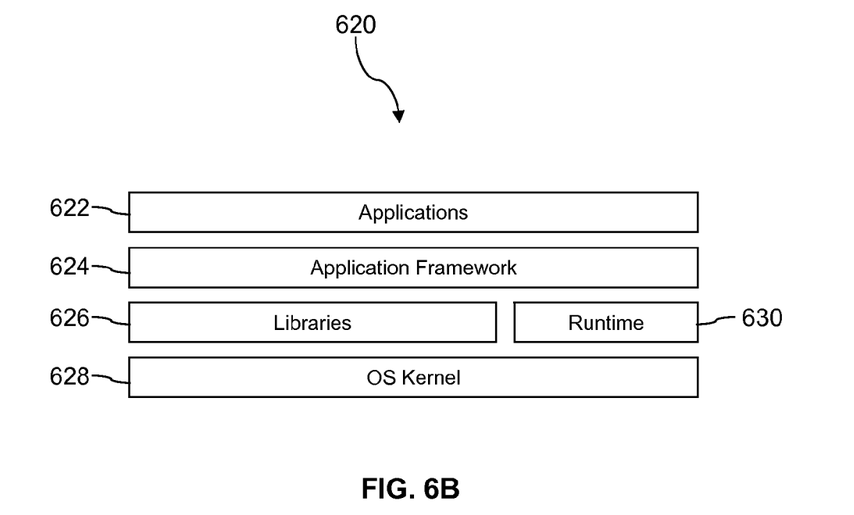
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
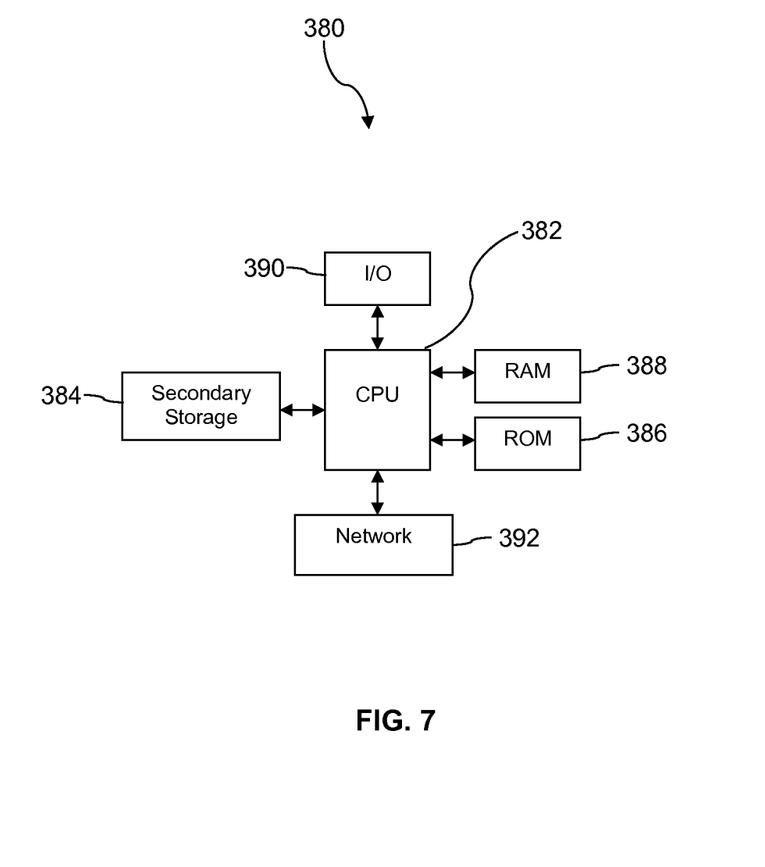
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing a pre-configuration mode for a mobile communication device supporting services, comprising:

comparing, by a server coupled to a non-transitory memory of a data store, signal characteristics of a mobile communication device received during registration of the mobile communication device with a base transceiver station with records of signal characteristics in the data store;

responsive to the mobile communication device not being provisioned for wireless communications service, not being assigned to any user account, and not being flagged as in a pre-configuration mode, assigning, by the server, a temporary identifier corresponding to a service profile to the mobile communication device selected from a plurality of temporary identifiers, wherein a limited set of services is assigned to the service profile, wherein each service profile from a plurality of service profiles defines a specific limited set of services from a plurality of sets of limited services, and wherein the limited set of services comprises less services than services to fully provisioned mobile communication devices and includes services other than emergency communication services;

monitoring, by the server, time elapse from the assignment of the temporary identifier; and responsive to a predefined period of time elapsing since the assignment of the temporary identifier and responsive to the mobile communication device not being provisioned, terminating, via the server, the limited set of services defined in the service profile by reducing one service at a time from the limited set of services after each predefined period of time elapses.

2. The method of claim 1, wherein the limited set of services comprises data and voice calls to a restricted set of addresses.

3. The method of claim 2, wherein the limited set of services comprises voice calls to local telephone numbers or through base transceiver stations maintained by a wireless communications service provider that assigned the temporary identifier to the mobile communication device.

4. The method of claim 2, wherein the limited set of services comprises data calls to a limited number of websites.

5. The method of claim 4, wherein the limited set of services comprises at least one of customer care data traffic or payment data traffic.

6. The method of claim 1, wherein based on a mobile equipment identifier (MEID) provided by the mobile communication device, a network of the wireless communications service provider searches for an equipment record of the mobile communication device.

7. The method of claim 1, wherein the mobile communication device is flagged in the data store as in a pre-configuration mode.

8. The method of claim 1, wherein the limited set of services supports unlimited emergency services.

9. The method of claim 1, further comprising transmitting an advertisement to the mobile communication device in response to the mobile communication device invoking a service.

10. The method of claim 1, wherein the limited set of services comprises only data and voice calls to a restricted set of addresses.

11. The method of claim 1, wherein comparing signal characteristics includes analyzing an equipment identifier of the mobile communication device prior to a network identifier or an access credential is assigned to the mobile communication device.

12. The method of claim 1, further comprising: prior to terminating the limited set of services, shrinking the limited set of services available to the mobile communication device by removing one service from the limited set of services at an interval of every predefined period of time that elapses since the assignment of the temporary identifier.

13. The method of claim 1, further comprising: prior to terminating the limited set of services, determining, by the server, whether the mobile communication device meets predefined criteria for allowing the mobile communication device to be provisioned.

14. The method of claim 13, wherein the predefined criteria include a determination of whether the mobile communication device comprises an operating system that has been upgraded for the first time after the mobile communication device is powered on.

15. The method of claim 1, further comprising: prior to terminating the limited set of services, determining, by the server, that the mobile communication device does not meet predefined criteria for allowing the mobile communication device to be provisioned, wherein at least one of the limited set of services is terminated based on the determination.

16. A method of managing a pre-configuration mode for an unprovisioned mobile communication device supporting services, comprising:

examining, by a server coupled to a non-transitory memory of a data store, signal characteristics from a mobile communication device during registration of the mobile communication device with a base transceiver station against records of signal characteristics in the data store;

responsive to the mobile communication device not being provisioned for wireless communications service, assigning, by the server, a service profile to the mobile communication device selected from a plurality of service profiles, wherein a limited set of services is assigned to the service profile, wherein each service profile from a plurality of service profiles defines a specific limited set of services from a plurality of sets of limited services, and wherein the limited set of services comprises less services than services to fully provisioned mobile communication devices and includes services other than emergency communication services;

monitoring, by the server, time elapse from the assignment of the service profile; and in response to a predefined period of time elapsing since the assignment of the service profile and responsive to the mobile communication device not being assigned to a user account and not being provisioned for wireless communications service, terminating, by the server, services defined in the service profile by reducing one service at a time from the limited set of services after each predefined period of time elapses.

17. The method of claim 16, wherein the mobile communication device comprises at least one of a mobile phone, a personal digital assistant (PDA), a wireless enabled computer, a media player, a laptop computer, a notebook computer, a tablet computer, a wearable computer, or a headset computer, and wherein the mobile communication device establishes a wireless communication with a radio access network according to a code division multiple access (CDMA) wireless communication protocol, a global system for mobile communication (GSM) wireless communication protocol, a long-term evolution (LTE) wireless communication protocol, or a world-wide interoperability for microwave access (WiMAX) wireless communication protocol.

18. The method of claim 16, wherein the limited set of services comprises voice calls through base transceiver stations from a home service provider of the mobile communication device.

19. The method of claim 16, further comprising presenting an advertisement to the mobile communication device in response to the mobile communication device invoking a service.

20. The method of claim 16, further comprising: prior to terminating the limited set of services, shrinking the limited set of services available to the mobile communication device by removing one service from the limited set of services at an interval of every predefined period of time that elapses since the assignment of the temporary identifier.

* * * * *